United States Patent
Cavanna et al.

(10) Patent No.: US 9,567,886 B2
(45) Date of Patent: Feb. 14, 2017

(54) METHOD TO CONTROL THE TEMPERATURE OF THE EXHAUST GASES OF A SUPERCHARGED INTERNAL COMBUSTION ENGINE

(71) Applicant: MAGNETI MARELLI S.p.A., Corbetta (IT)

(72) Inventors: Filippo Cavanna, Bologna (IT); Riccardo Lanzoni, Imola (IT)

(73) Assignee: Magneti Marelli S.p.A., Corbetta (IT)

( * ) Notice: Subject to any disclaimer, the term of this patent is extended or adjusted under 35 U.S.C. 154(b) by 0 days.

(21) Appl. No.: 14/954,219

(22) Filed: Nov. 30, 2015

(65) Prior Publication Data

US 2016/0153331 A1   Jun. 2, 2016

(30) Foreign Application Priority Data

Dec. 2, 2014 (IT) .............................. BO2014A0676

(51) Int. Cl.
*F01N 3/00* (2006.01)
*F01N 3/05* (2006.01)
*F01N 13/10* (2010.01)
*F02D 41/00* (2006.01)
*F02D 41/18* (2006.01)
*F02B 77/08* (2006.01)
*F02B 37/00* (2006.01)
*F02D 41/14* (2006.01)
*F02B 25/00* (2006.01)
(Continued)

(52) U.S. Cl.
CPC ................. *F01N 3/05* (2013.01); *F01N 13/10* (2013.01); *F02B 37/00* (2013.01); *F02B 77/086* (2013.01); *F02D 41/0007* (2013.01); *F02D 41/1454* (2013.01); *F02D 41/1458* (2013.01); *F02D 41/18* (2013.01); *F02B 25/00* (2013.01); *F02B 29/06* (2013.01); *F02D 13/0261* (2013.01); *F02D 23/00* (2013.01); *F02D 2041/001* (2013.01); *F02M 26/05* (2016.02); *F02M 26/06* (2016.02)

(58) Field of Classification Search
USPC ........... 60/274, 276, 80, 285, 286, 287, 289, 293,60/299, 598, 600, 602, 614, 615
See application file for complete search history.

(56) References Cited

U.S. PATENT DOCUMENTS 6,293,097 B1 * 9/2001 Wu .................... B01D 53/9431
417/38
6,817,173 B2 * 11/2004 Paffrath .................... F01N 3/22
60/289

(Continued)

*Primary Examiner* — Binh Q Tran
(74) *Attorney, Agent, or Firm* — Howard & Howard Attorneys PLLC (57) ABSTRACT

A method to control the temperature of the exhaust gases of a supercharged internal combustion engine, the method comprising: determining the minimum air/fuel ratio of the exhaust gases downstream of the exhaust manifold as a function of the flow rate of air that is not involved in the combustion taking place inside the cylinders and flows directly from the intake manifold into the exhaust pipe; detecting an air/fuel ratio of the exhaust gases downstream of the exhaust manifold by means of a sensor; and controlling the supercharged internal combustion engine as a function of the comparison between the air/fuel ratio of the exhaust gases detected by the sensor and/or the minimum air/fuel ratio of the exhaust gases with a number of threshold values.

11 Claims, 3 Drawing Sheets

(51) Int. Cl.
  *F02B 29/06* (2006.01)
  *F02D 13/02* (2006.01)
  *F02D 23/00* (2006.01)

(56) References Cited

U.S. PATENT DOCUMENTS

| | | | |
|---|---|---|---|
| 7,231,760 B2* | 6/2007 | Busch | F01N 3/22 60/274 |
| 7,980,060 B2* | 7/2011 | Tachimoto | F01N 9/002 60/277 |
| 8,359,839 B2* | 1/2013 | Van Nieuwstadt | F02D 13/0261 60/274 |

* cited by examiner

METHOD TO CONTROL THE TEMPERATURE OF THE EXHAUST GASES OF A SUPERCHARGED INTERNAL COMBUSTION ENGINE

TECHNICAL FIELD

The present invention relates to a method to control the temperature of the exhaust gases of a supercharged internal combustion engine.

PRIOR ART

As it is known, an internal combustion engine supercharged by means of a turbocharger supercharging system comprises a number of cylinders, each connected to an intake manifold by means of at least one respective intake valve and to an exhaust manifold by means of at least one respective exhaust valve. The intake manifold receives a gas mixture comprising both exhaust gases and fresh air, i.e. air coming from the outside through an intake pipe. The exhaust manifold is connected to an exhaust pipe, which feeds the exhaust gases produced by the combustion to an exhaust system, which releases the gases produced by the combustion into the atmosphere and normally comprises at least one catalytic converter (if necessary, provided with a diesel particulate filter) and at least one silencer (not shown) arranged downstream of the catalytic converter.

The internal combustion engine supercharging system comprises a turbocharger provided with a turbine, which is arranged along the exhaust pipe so as to rotate at a high speed due to the action of the exhaust gases expelled from the cylinders, and a supercharger, which is arranged along the intake pipe and is mechanically connected to the turbine so as to be caused to rotate by the turbine itself in order to increase the pressure of the air present in the feeding pipe.

The internal combustion engine is controlled by an electronic control unit, which controls the operation of all the components of the internal combustion engine. In particular, the electronic control unit is designed to control the supercharged internal combustion engine for the operation in its normal operating mode and in its "scavenging" operating mode, which involves a significant passage of air from the intake manifold directly into the exhaust pipe.

Typically, the passage of air from the intake manifold directly into the exhaust pipe is obtained by properly timing the intake valves connecting each cylinder to the intake manifold and the exhaust valves connecting each cylinder to the exhaust manifold, so as to allow fresh air to directly flow from the intake manifold to the exhaust manifold and, hence, to the exhaust pipe of the internal combustion engine.

The "scavenging" operating mode of the supercharged internal combustion engine permits a reduction in the turbocharger lag (phenomenon also known as turbo-lag), thus increasing the enthalpy drop available to the turbocharger, though it becomes extremely important to control the temperature of the exhaust system in a reliable manner, so as to avoid causing damages to the exhaust system itself and, in particular, to the catalytic converter and the silencer.

DESCRIPTION OF THE INVENTION

The object of the present invention is to provide a method to control the temperature of the exhaust gases of a supercharged internal combustion engine, which is not affected by the drawbacks of the prior art and, at the same time, is easy and cheap to be implemented.

According to the present invention, there is provided a method to control the temperature of the exhaust gases of a supercharged internal combustion engine according to the appended claims.

BRIEF DESCRIPTION OF THE DRAWINGS

The present invention will now be described with reference to the accompanying drawings, which show a non-limiting embodiment thereof, wherein.

PREFERRED EMBODIMENTS OF THE INVENTION

Figure 1:
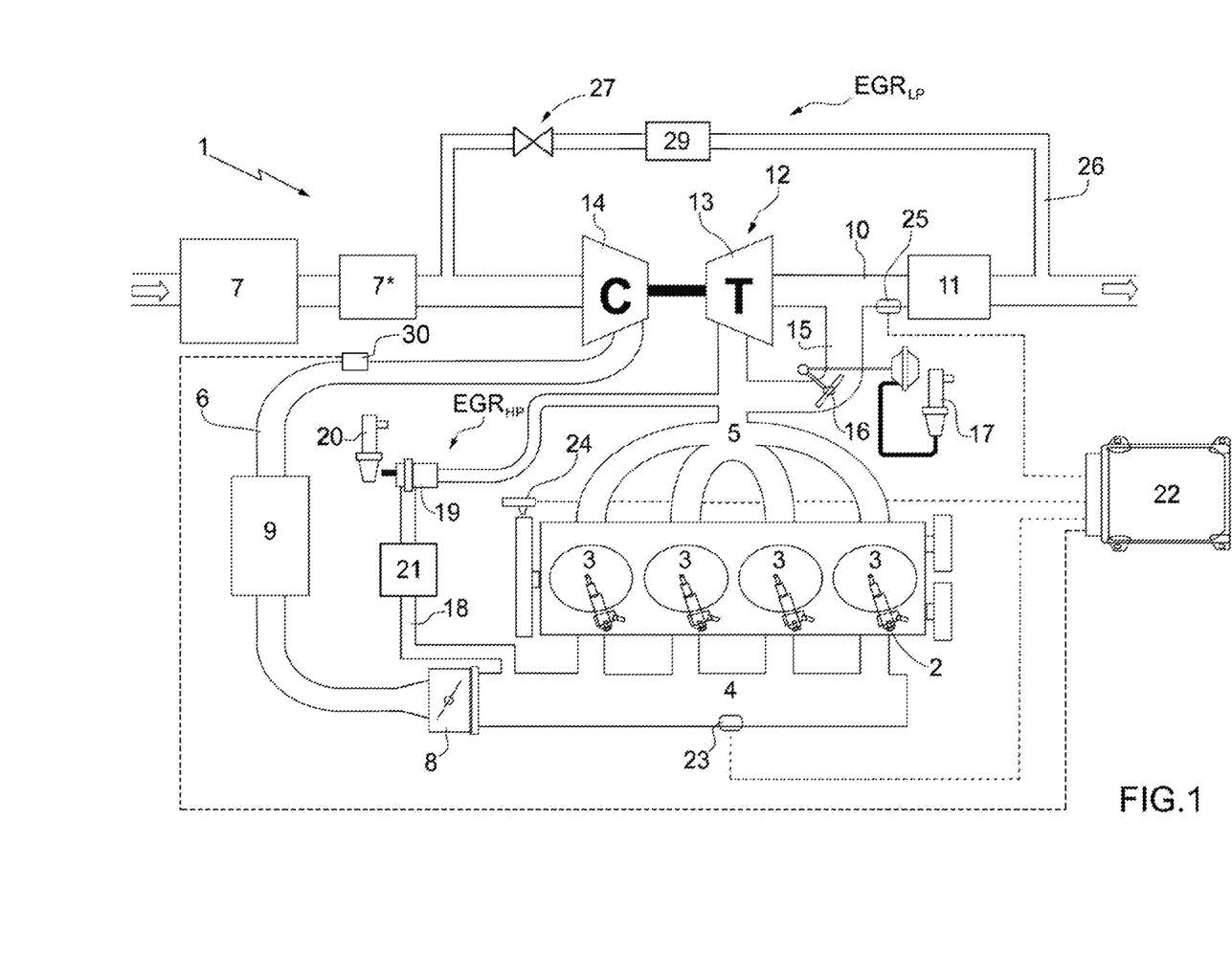
FIG. 1 schematically shows a supercharged internal combustion engine provided with an electronic control unit implementing the method according to the present invention.

In FIG. 1, number 1 indicates, as a whole, an internal combustion engine supercharged by means of a turbocharger supercharging system.

The internal combustion engine 1 comprises four injectors 2, which directly inject fuel, preferably gasoline, into four cylinders 3, each connected to an intake manifold 4 by means of at least one respective intake valve 4* and to an exhaust manifold 5 by means of at least one respective exhaust valve 5*.

The intake manifold 4 receives a gas mixture comprising both exhaust gases (as described more in detail below) and fresh air, i.e. air coming from the outside through an intake pipe 6, which is provided with an air filter 7 for the fresh air flow and is regulated by a throttle valve 8. Along the intake pipe 6, downstream of the air filter 7, there is also provided an air flow meter 7*, which is designed to detect the mass of the flow of fresh air taken in by the internal combustion engine 1.

Along the intake pipe 6 there is provided an intercooler 9, which fulfils the function of cooling the air taken in and is preferably built-in in the intake manifold 4. The exhaust manifold 5 is connected to an exhaust pipe 10, which feeds the exhaust gases produced by the combustion to an exhaust system, which releases the gases produced by the combustion into the atmosphere and normally comprises at least one catalytic converter 11 (if necessary, provided with a diesel particulate filter) and at least one silencer (not shown) arranged downstream of the catalytic converter 11.

The supercharging system of the internal combustion engine 1 comprises a turbocharger 12 provided with a turbine 13, which is arranged along the exhaust pipe 10 so as to rotate at a high speed due to the action of the exhaust gases expelled from the cylinders 3, and a supercharger 14, which is arranged along the intake pipe 6 and is mechanically connected to the turbine 13 so as to be caused to rotate by the turbine 13 itself in order to increase the pressure of the air present in the feeding pipe 6.

Along the exhaust pipe 10 there is provided a bypass pipe 15, which is connected in parallel to the supercharger 13 so as to have its ends connected upstream and downstream of the supercharger 13 itself; along the bypass pipe 15 there is provided a wastegate valve 16, which is designed to adjust the flow rate of the exhaust gases flowing through the bypass pipe 15 and is controlled by a solenoid valve 17.

The internal combustion engine 1 comprises, furthermore, a high pressure circuit $EGR_{HP}$, which comprises, in turn, a bypass pipe connected in parallel to the assembly consisting of the four cylinders 3, the intake manifold 4 and the exhaust manifold 5. Along the bypass pipe 18 there is provided a blowoff valve 19, which is designed to adjust the flow rate of the exhaust gases flowing through the bypass pipe 18 and is controlled by an EGR solenoid valve 20. Along the bypass pipe 18, downstream of the blowoff valve 19, there is provided a heat exchanger 21, which fulfils the function of cooling the gases flowing out of the exhaust manifold 5.

The internal combustion engine 1 is controlled by an electronic control unit 22, which controls the operation of all the components of the internal combustion engine 1. The electronic control unit 22 is connected to a sensor 23 measuring the temperature and the pressure of the gas mixture present in the intake manifold 4, to a sensor 24 measuring the number of revolutions per minute of the internal combustion engine 1, and to a sensor 25 (typically a UHEGO or UEGO linear oxygen sensor—which is known and not described below) measuring the air/fuel ratio of the exhaust gases upstream of the catalytic converter 11.

Finally, the internal combustion engine 1 comprises a low pressure circuit $EGR_{LP}$, which comprises, in turn, a bypass pipe 26 arranged along the exhaust pope 10; the bypass pipe 26 is connected in parallel to the turbocharger 12. Along the bypass pipe 26 there is provided an EGR valve 27, which is designed to adjust the flow rate of the exhaust gases flowing through the bypass pipe 26. Along the bypass pipe 26, upstream of the valve 27, there is also provided a heat exchanger 29, which fulfils the function of cooling the gases flowing out of the exhaust manifold 5 and into the supercharger 14.

Finally, the electronic control unit 22 is connected to a sensor 30 which measures the quantity of oxygen present in the gas mixture flowing in the intake pipe 6 and is arranged along the intake pipe upstream both of the intercooler 9 and of the throttle valve 8.

The measure of the quantity of oxygen present in the gas mixture flowing in the intake pipe 6 is used by the electronic control nit 22 to determine the flow rate of the exhaust gases of the low pressure circuit $EGR_{LP}$.

Hereinafter you will find a description of the way in which the electronic control unit 22 control the temperature of the exhaust gases through the measurement of the air/flow ratio of the exhaust gases upstream of the catalytic converter 11, which is provided by the sensor 25.

The electronic control unit 22 is designed to control the supercharged internal combustion engine 1 for the operation in its normal operating mode and in its "scavenging" operating mode, which involves a significant passage of air from the intake manifold 4 directly into the exhaust pipe 10 of the internal combustion engine 1.

Typically, the passage of air from the intake manifold 4 directly into the exhaust pipe 10 is obtained by properly timing the intake valves (not shown) connecting each cylinder 3 to the intake manifold 4 and the exhaust valves (not shown) connecting each cylinder 3 to the exhaust manifold 5, so as to allow fresh air to directly flow from the intake manifold 4 to the exhaust manifold 5 and, hence, to the exhaust pipe 10 of the internal combustion engine 1. It is clear that the intake valves (not shown) connecting each cylinder 3 to the intake manifold 4 and the exhaust valves (not shown) connecting each cylinder 3 to the exhaust manifold 5 can be operated by means of a known actuator, for example a VVT (Variable Valve Timing) actuator, or also with an electromagnetic camless actuator or an electro-hydraulic actuator.

According to a further embodiment, the electronic control unit 22 is also designed to control the supercharged internal combustion engine 1 so as to increase the mass and volume flow rate of the air and/or exhaust gases flowing through the supercharger 14 and the turbine 13, relative to the air flow rate actually used by the supercharged internal combustion engine during the combustion to generate the desired power.

Figure 2:
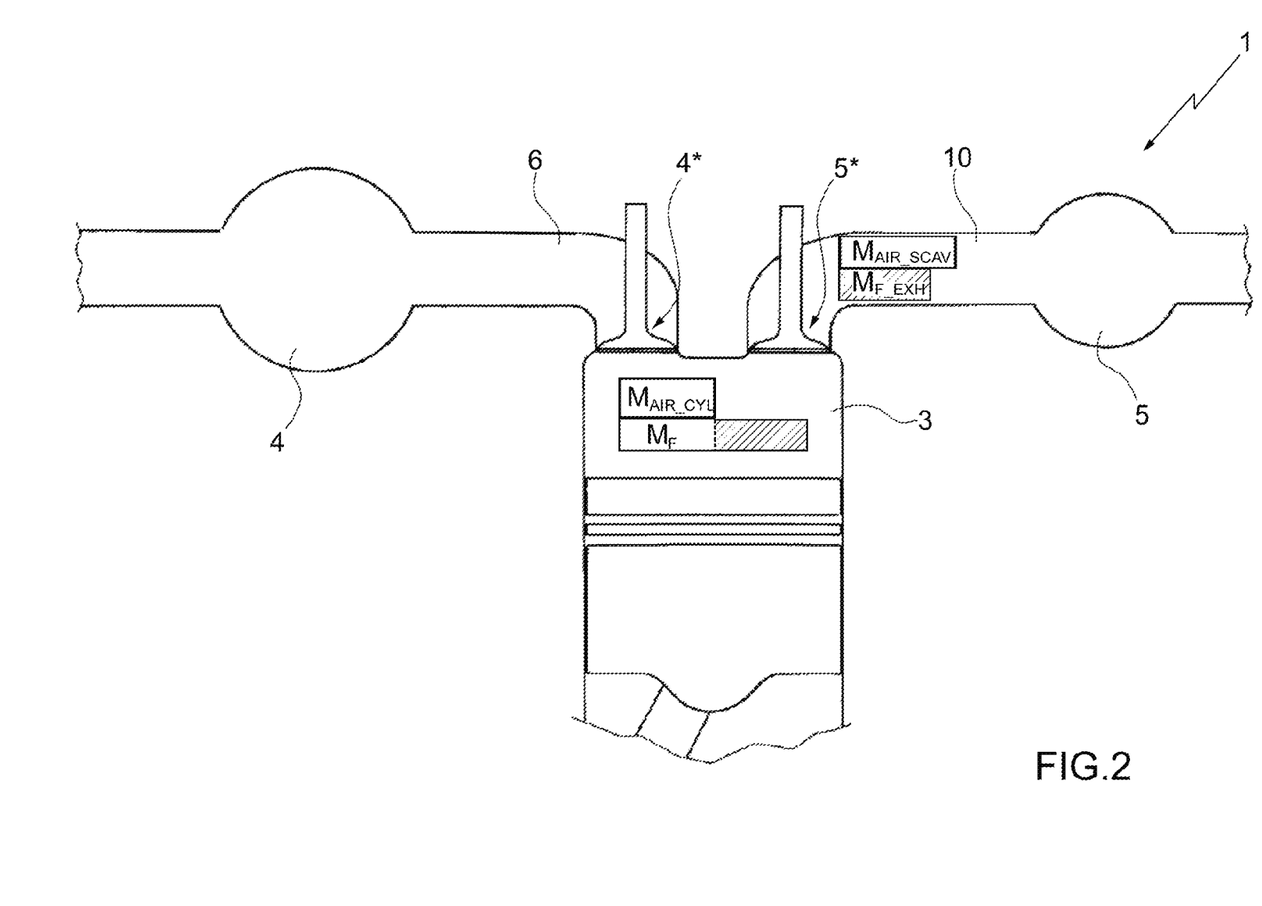
FIG. 2 schematically shows a cylinder of the supercharged internal combustion engine of FIG. 1.
Figure 3:
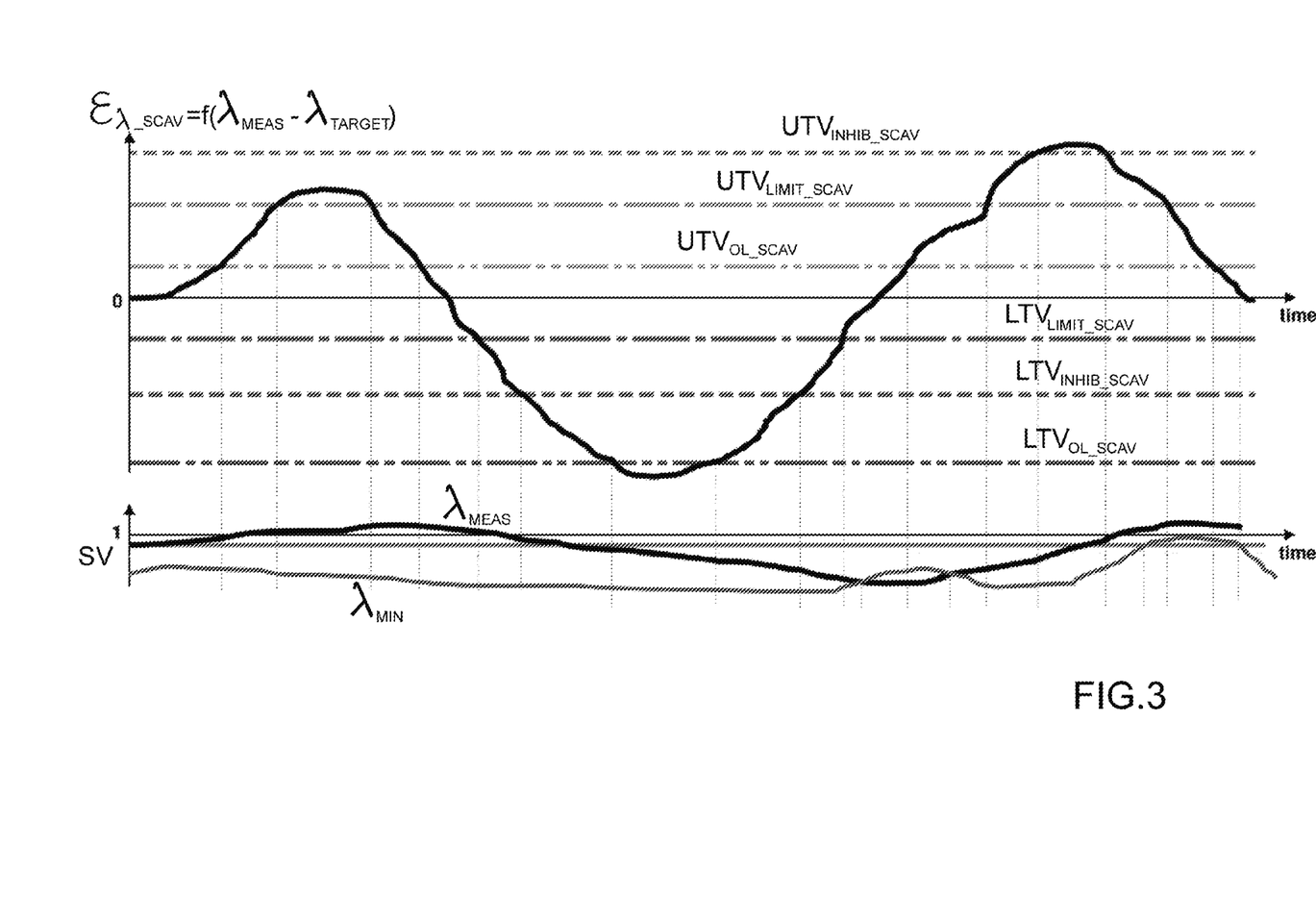
FIG. 3 shows the development of the air/fuel ratio in the exhaust system of the supercharged internal combustion engine of FIG. 1.

According to FIG. 2, in case of a "scavenging" configuration, the temperature of the exhaust gases is generated by two contributions: the first contribution derives from the heat of the mass of fuel that was not involved in the combustion taking place inside the cylinder 3 and reacts, in the exhaust manifold 5, with the oxygen of the flow rate $m_{air\_scav}$ of scavenging air, the second contribution, on the other hand, derives from the heat generated by the residual oxygen of the flow rate $m_{air\_scav}$ of scavenging air that does not react with the mass of fuel that was not involved in the combustion taking place inside the cylinder 3 and potentially reacts with combustion residues.

In order to avoid an excessive increase of the temperature of the exhaust gases, the electronic control unit 22 is designed to control the supercharged internal combustion engine 1 so as to limit—as much as possible—both the first contribution and the second contribution, namely to limit—as much as possible—the input of heat deriving both from the mass of fuel that was not involved in the combustion taking place inside the cylinder 3 and reacts, in the exhaust manifold 5, with the oxygen of the flow rate $m_{air\_scav}$ of scavenging air and from the residual oxygen of the flow rate $m_{air\_scav}$ of scavenging air that does not react with the mass of fuel that was not involved in the combustion taking place inside the cylinder 3 and potentially reacts with combustion residues. In other words, based on the flow rate $m_{air\_scav}$ of scavenging air, the electronic control unit 22 is designed to limit the heat generated by the mass of fuel that was not involved in the combustion taking place inside the cylinder 3 and reacts, in the exhaust manifold 5, with the oxygen of the flow rate $m_{air\_scav}$ of scavenging air.

Given the flow rate $m_{air\_scav}$ of scavenging air, the heat balance in the exhaust system cam be calculated as follows:

$$c_{p\_exh} * m_{exh} * \Delta T_{max} = m_{f\_exh} * k_i + (m_{air\_scav} - m_{f\_exh} * A_{st}/F_{st}) * \Delta h \quad [1]$$

$c_{p\_exh}$ specific heat in the exhaust system;
$m_{exh}$ flow rate in the exhaust system;
$\Delta T_{max}$ maximum temperature difference in the exhaust system;
$m_{f\_exh}$ flow rate of fuel that was not involved in the combustion taking place inside the cylinder 3 and reacts, in the exhaust manifold 5, with the oxygen of the flow rate $m_{air\_scav}$ of scavenging air;
$k_i$ lower heating value of the fuel being used;
$A_{st}/F_{st}$ stoichiometric ratio of the fuel being used;
$m_{air\_scav}$ flow rate of scavenging air; and
$\Delta h$ enthalpy drop.

The flow rate $m_{exh}$ in the exhaust system can be expressed as follows:

$$m_{exh} = m_f + m_{air\_scav} + m_{air\_cyl} \quad [2]$$

$m_{exh}$ flow rate in the exhaust system;
$m_{air\_scav}$ flow rate of scavenging air;
$m_f$ flow rate of fuel involved in the combustion taking place inside the cylinder 3;

$m_{air\_cyl}$ flow rate of fuel that is involved in the combustion taking place inside the cylinder 3 and reacts with the flow rate $m_f$ of fuel.

Inserting the equation [2] in the balance [1], you obtain that:

$$c_{p\_exh}*(m_f+m_{air\_scav}+m_{air\_cyl})*\Delta T_{max}=m_{f\_exh}*k_i+(m_{air\_scav}-m_{f\_exh}*A_{st}/F_{st})*\Delta h \qquad [3]$$

The flow rate $m_{f\_exh}$ of fuel that was not involved in the combustion taking place inside the cylinder 3 and reacts, in the exhaust manifold 5, with the oxygen of the flow rate $m_{air\_scav}$ of scavenging air an be expressed as follows:

$$m_{f\_exh}=m_f-\frac{m_{air\_cyl}}{A_{st}/F_{st}} \qquad [4]$$

$m_{f\_exh}$ flow rate of fuel that was not involved in the combustion inside the cylinder 3 and reacts, in the exhaust manifold 5, with the oxygen of the flow rate $m_{air\_scav}$ of scavenging air;

$A_{st}/F_{st}$ stoichiometric ratio of the fuel being used;

$m_f$ flow rate of fuel involved in the combustion taking place inside the cylinder 3; and $m_{air\_cyl}$ flow rate of fuel that is involved in the combustion taking place inside the cylinder 3 and reacts with the flow rate $m_f$ of fuel.

Inserting the equation [4] in the balance [3], the result is:

$$c_{p\_exh}*(m_f+m_{air\_scav}+m_{air\_cyl})*\Delta T_{max}= \\ m_{air\_scav}*\Delta h+\left(m_f-\frac{m_{air\_cyl}}{A_{st}/F_{st}}\right)*(k_i-\Delta h*A_{st}/F_{st}) \qquad [5]$$

From the equation [5], with some simple passages, you can obtain that:

$$m_f(c_{p\_exh}*\Delta T_{max}-k_i+\Delta h*A_{st}/F_{st})= \\ m_{air\_scav}(\Delta h-c_{p\_exh}*\Delta T_{max})+ \\ m_{air\_cyl}\left(\Delta h-\frac{k_i}{A_{st}/F_{st}}-c_{p\_exh}*\Delta T_{max}\right) \qquad [6]$$

The minimum air/fuel ratio $\lambda_{min}$ that can be obtained in the exhaust gases upstream of the catalytic converter 11 during the operation of the internal combustion engine 1 in the scavenging configuration is established by the expression:

$$\lambda_{min}=\frac{m_{air\_cyl}}{A_{st}/F_{st}*m_f} \qquad [7]$$

$\lambda_{min}$ minimum air/fuel ratio that can be obtained in the exhaust gases upstream of the catalytic converter 11;

$A_{st}/F_{st}$ stoichiometric ratio of the fuel being used;

$m_f$ flow rate of fuel involved in the combustion taking place inside the cylinder 3; and $m_{air\_cyl}$ flow rate of fuel that is involved in the combustion taking place inside the cylinder 3 and reacts with the flow rate $m_f$ of fuel.

The minimum air/fuel ratio $\lambda_{min}$ that can be obtained in the exhaust gases upstream of the catalytic converter 11 during the operation of the internal combustion engine 1 in the scavenging configuration, expressed by the formula [7], can be expressed as follows using the equation [6]:

$$\lambda_{min}=\frac{m_{air\_cyl}(c_{p\_exh}*\Delta T_{max}-k_i+\Delta h*A_{st}/F_{st})}{m_{air\_scav}(\Delta h*A_{st}/F_{st}-c_{p\_exh}*\Delta T_{max}*A_{st}/F_{st})+} \\ m_{air\_cyl}(\Delta h*A_{st}/F_{st}-k_i-c_{p\_exh}*\Delta T_{max}*A_{st}/F_{st}) \qquad [8]$$

Generally speaking, the following equation applies:

$$c_p*\Delta T=\Delta h \qquad [9]$$

$c_p$ specific heat of the air;

$\Delta T_{max}$ temperature difference; and $\Delta h$ enthalpy drop.

For the sake of simplicity, we consider the specific heat $C_{p\_exh}$ in the exhaust system as equal to the specific heat $c_p$ of the air; if we insert the value of the enthalpy drop obtained from the equation [9] in the equation [8], the minimum air/fuel ratio $\lambda_{min}$ that can be obtained in the exhaust gases upstream of the catalytic converter 11 during the operation of the internal combustion engine 1 in the scavenging configuration is the following:

$$\lambda_{min}=\frac{m_{air\_cyl}(k_i-c_p\Delta T_{max}(1+A_{st}/F_{st}))}{m_{air\_cyl}*k_i} \qquad [10]$$

$$\lambda_{min}=1-\frac{c_p\Delta T_{max}}{k_i}*(1+A_{st}/F_{st}) \qquad [11]$$

$\lambda_{min}$ minimum air/fuel ratio that can be obtained in the exhaust gases upstream of the catalytic converter 11;

$c_p$ specific heat of the air;

$\Delta T_{max}$ maximum temperature difference in the exhaust system;

$A_{st}/F_{st}$ stoichiometric ratio of the fuel being used; and $k_i$ lower heating value of the fuel being used.

In order to control the temperature of the exhaust gases through the measurement of the air/fuel ratio of the exhaust gases upstream of the catalytic converter 11 when the supercharged internal combustion engine 1 operates in the "scavenging" operating mode (i.e. when there is a significant passage of air from the intake manifold 4 directly into the exhaust pipe 10 of the internal combustion engine 1), the electronic control unit 22 is designed to learn the value of the air/fuel ratio $\lambda_{meas}$ of the exhaust gases upstream of the catalytic converter 11 provided by the sensor 25 and to compare it with a reference value of the air/fuel ratio $\lambda_{target}$ of the exhaust gases upstream of the catalytic converter 11. In particular, the electronic control unit 22 is designed to calculate the difference between the value of the air/fuel ratio $\lambda_{meas}$ of the exhaust gases upstream of the catalytic converter 11 provided by the sensor 25 and the reference value of the air/fuel ratio $\lambda_{target}$ of the exhaust gases upstream of the catalytic converter 11. The reference value of the air/fuel ratio $\lambda_{target}$ of the exhaust gases upstream of the catalytic converter 11 is variable based on the flow rate $m_{air\_scav}$ of air that is not involved in the combustion taking place inside the cylinders 3 and flows directly from the intake manifold 4 into the exhaust pipe 10.

The reference value of the air/fuel ratio $\lambda_{target}$ is determined based on the operating condition to be taken on by the operation of the internal combustion engine 1. In particular, the reference value of the air/fuel ratio $\lambda_{target}$ is variable based on the engine point and on the thermal state of the internal combustion engine 1 (normally defined starting from the measure of the temperature of the cooling liquid). In particular, the electronic control unit 22 is designed to exploit as much as possible, in a given condition, the potential enthalpy drop Δh generated by the "scavenging" operating mode so as to favour the turbocharger 12 (in other words, the reference value of the air/fuel ratio $\lambda_{target}$ leans towards the minimum air/fuel ratio $\lambda_{min}$) or, alternatively, to heat the catalytic converter 11 or to restore the oxygen content, for example after an operating step with a basically rich mixture (in other words, the reference value of the air/fuel ratio $\lambda_{target}$ is equal to 1 or is basically lean).

After having calculated the difference between the value of the air/fuel ratio $\lambda_{meas}$ of the exhaust gases upstream of the catalytic converter 11 provided by the sensor 25 and the reference value of the air/fuel ratio $\lambda_{target}$ of the exhaust gases upstream of the catalytic converter 11, we can determine an air/fuel ratio measure error $\epsilon_{\lambda\_scav}$ by applying a filter to the difference between the air/fuel ratio $\lambda_{meas}$ of the exhaust gases upstream of the catalytic converter 11 provided by the sensor 25 and the reference value of the air/fuel ratio $\lambda_{target}$ of the exhaust gases upstream of the catalytic converter 11.

Therefore, the air/fuel ratio measure error $\epsilon_{\lambda\_scav}$ when the supercharged internal combustion engine 1 works in the "scavenging" operating mode can be expressed as follows:

$$\epsilon_{\lambda\_scav} = F(\lambda_{meas} - \lambda_{target}) \qquad [12]$$

$\epsilon_{\lambda\_scav}$ air/fuel ratio measure error when the supercharged internal combustion engine 1 works in the "scavenging" operating mode;

$\lambda_{meas}$ value of the air/fuel ratio of the exhaust gases upstream of the catalytic converter 11 provided by the sensor 25; and $\lambda_{target}$ value of the air/fuel ratio of the exhaust gases upstream of the catalytic converter 11.

In a preliminary adjustment and set up phase, an interval of safety values is defined for the operation of the supercharged internal combustion engine 1 in the "scavenging" operating mode. In particular, said interval of safety values for the operation of the supercharged internal combustion engine 1 in the "scavenging" operating mode is defined by an upper threshold value $UTV_{LIMIT\_SCAV}$ and by a lower threshold value $LTV_{LIMIT\_SCAV}$. The electronic control unit 22 is designed to compare the air/fuel ratio measure error $\epsilon_{\lambda\_scav}$ with the interval of safety values for the operation of the supercharged internal combustion engine 1 in the "scavenging" operating mode, i.e. with the upper threshold value $UTV_{LIMIT\_SCAV}$ and with the lower threshold value $LTV_{LIMIT\_SCAV}$. In case the air/fuel ratio measure error $\epsilon_{\lambda\_scav}$ lies within the interval of safety values for the operation of the supercharged internal combustion engine 1 in the "scavenging" operating mode defined by the upper threshold value $UTV_{LIMIT\_SCAV}$ and by the lower threshold value $LTV_{LIMIT\_SCAV}$, the electronic control unit 22 is designed to carry on with the operation of the internal combustion engine 1 in the "scavenging" operating mode. In case the air/fuel ratio measure error $\epsilon_{\lambda\_scav}$ doe not lie within the interval of safety values for the operation of the supercharged internal combustion engine 1 in the "scavenging" operating mode defined by the upper threshold value $UTV_{LIMIT\_SCAV}$ and by the lower threshold value $LTV_{LIMIT\_SCAV}$, the electronic control unit 22 is designed to limit the operation of the internal combustion engine 1 in the "scavenging" operating mode.

In other words, the electronic control unit 22 is designed to limit the flow rate $m_{air\_scav}$ of air that is not involved in the combustion taking place inside the cylinders 3 and flows directly from the intake manifold 4 into the exhaust pipe 10, if the air/fuel ratio $\lambda_{meas}$ of the exhaust gases detected by the sensor 25 does not lie within the interval of safety values defined by the pair of threshold values $UTV_{LIMIT\_SCAV}$, $LTV_{LIMIT\_SCAV}$.

In a preliminary adjustment and set up phase, an interval of inhibition values is defined, outside which the operation of the supercharged internal combustion engine 1 in the "scavenging" operating mode must be inhibited. In particular, said interval of inhibition values for the operation of the supercharged internal combustion engine 1 in the "scavenging" operating mode is defined by an upper threshold value $UTV_{INHIB\_SCAV}$ and by a lower threshold value $LTV_{INHIB\_SCAV}$. The electronic control unit 22 is designed to compare the air/fuel ratio measure error $\epsilon_{\lambda\_scav}$ with the interval of inhibition values for the operation of the supercharged internal combustion engine 1 in the "scavenging" operating mode, i.e. with the upper threshold value $UTV_{INHIB\_SCAV}$ and with the lower threshold value $LTV_{INHIB\_SCAV}$. In case the air/fuel ratio measure error $\epsilon_{\lambda\_scav}$ lies within the interval of inhibition values for the operation of the supercharged internal combustion engine 1 in the "scavenging" operating mode defined by the upper threshold value $UTV_{INHIB\_SCAV}$ and by the lower threshold value $LTV_{INHIB\_SCAV}$, the electronic control unit 22 is designed to carry on with the operation of the internal combustion engine 1 in the "scavenging" operating mode. In case the air/fuel ratio measure error $\epsilon_{\lambda\_scav}$ doe not lie within the interval of inhibition values for the operation of the supercharged internal combustion engine 1 in the "scavenging" operating mode defined by the upper threshold value $UTV_{INHIB\_SCAV}$ and by the lower threshold value $LTV_{INHIB\_SCAV}$, the electronic control unit 22 is designed to stop the operation of the internal combustion engine 1 in the "scavenging" operating mode.

Clearly, the upper threshold value $UTV_{INHIB\_SCAV}$ is greater than the upper threshold value $UTV_{LIMIT\_SCAV}$ and the lower threshold value $LTV_{INHIB\_SCAV}$ is greater (in absolute value) than the lower threshold value $LTV_{LIMIT\_SCAV}$.

In other words, the interval of inhibition values, outside which the operation of the supercharged internal combustion engine 1 in the "scavenging" operating mode must be inhibited, is wider than the interval of safety value, outside which the operation of the supercharged internal combustion engine 1 in the "scavenging" operating mode must be limited.

Finally, in a preliminary adjustment and set up phase, an interval of closed-loop values is defined, outside which the air/fuel ratio must be controlled in an open-loop operating mode. In particular, said interval of closed-loop values for the operation of the supercharged internal combustion engine 1 in the "scavenging" operating mode is defined by an upper threshold value $UTV_{OL\_SCAV}$ and by a lower threshold value $LTV_{OL\_SCAV}$. The electronic control unit 22 is designed to compare the air/fuel ratio measure error $\epsilon_{\lambda\_scav}$ with the interval of closed-loop values for the operation of the supercharged internal combustion engine 1 in the "scavenging" operating mode, i.e. with the upper threshold value $UTV_{OL\_SCAV}$ and with the lower threshold value $LTV_{OL\_SCAV}$. In case the air/fuel ratio measure error $\epsilon_{\lambda\_scav}$ lies within the interval of closed loop values defined by the upper threshold value $UTV_{OL\_SCAV}$ and by the lower threshold value $LTV_{OL\_SCAV}$, the electronic control unit 22 is designed to control the air/fuel ratio during the operation of the internal combustion engine 1 in the "scavenging" operating mode in closed-loop. In case the air/fuel ratio measure error $\epsilon_{\lambda\_scav}$ does not lie within the interval of closed loop values defined by the upper threshold value $UTV_{OL\_SCAV}$ and by the lower threshold value $LTV_{OL\_SCAV}$, the electronic control unit 22 is designed to control the air/fuel ratio during the operation of the internal combustion engine 1 in the "scavenging" operating mode in open-loop.

Typically, the upper threshold value $UTV_{OL\_SCAV}$ is smaller both than the upper threshold value $UTV_{INHIB\_SCAV}$ and than the upper threshold value $UTV_{LIMIT\_SCAV}$; whereas the lower threshold value $LTV_{OL\_SCAV}$ is greater (in absolute value) both than the lower threshold value $LTV_{INHIB\_SCAV}$ and then lower threshold value $LTV_{LIMIT\_SCAV}$.

Furthermore, in order to control the temperature of the exhaust gases through the measurement of the air/fuel ratio of the exhaust gases upstream of the catalytic converter 11 when the supercharged internal combustion engine 1 operates in the "scavenging" operating mode (i.e. when there is a significant passage of air from the intake manifold 4 directly into the exhaust pipe 10 of the internal combustion engine 1), the electronic control unit 22 is designed to carry out a further check on the value of the air/fuel ratio $\lambda_{meas}$ of the exhaust gases upstream of the catalytic converter 11 provided by the sensor 25. In particular, the electronic control unit 22 is configured to filter the value of the air/fuel ratio $\lambda_{meas}$ of the exhaust gases upstream of the catalytic converter 11 provided by the sensor 25 and to compare it with the minimum air/fuel ratio $\lambda_{min}$ that can be obtained in the exhaust gases upstream of the catalytic converter 11 during the operation of the internal combustion engine 1 in the scavenging operating mode, as calculated through the equation [11] set forth in the description above.

In case the filtered value of the air/fuel ratio $\lambda_{meas}$ of the exhaust gases upstream of the catalytic converter 11 provided by the sensor 25 is greater than the minimum air/fuel ratio $\lambda_{min}$ that can be obtained in the exhaust gases upstream of the catalytic converter 11 during the operation of the internal combustion engine 1, the electronic control unit 22 is configured to carry on with the operation of the internal combustion engine 1 in the "scavenging" operating mode. In case the filtered value of the air/fuel ratio $\lambda_{mea}$ of the exhaust gases upstream of the catalytic converter 11 provided by the sensor 25 is smaller than the minimum air/fuel ratio $\lambda_{min}$ that can be obtained in the exhaust gases upstream of the catalytic converter 11 during the operation of the internal combustion engine 1, the electronic control unit 22 is configured to limit the operation of the internal combustion engine 1 in the "scavenging" operating mode. In other words, the electronic control unit 22 is designed to limit the flow rate $m_{air\_scav}$ of air that is not involved in the combustion taking place inside the cylinders 3 and flows directly from the intake manifold 4 into the exhaust pipe 10, if the air/fuel ratio $\lambda_{meas}$ of the exhaust gases detected by the sensor 25 becomes smaller than the minimum air/fuel ratio $\lambda_{min}$.

Finally, the electronic control unit 22 is configured to carry out a further check on the minimum air/fuel ratio $\lambda_{min}$ that can be obtained in the exhaust gases upstream of the catalytic converter 11 during the operation of the internal combustion engine 1 in the scavenging operating mode, as calculated through the equation [11] set forth in the description above. In particular, the electronic control unit 22 is designed to compare the minimum air/fuel ratio $\lambda_{min}$ that can be obtained in the exhaust gases upstream of the catalytic converter 11 during the operation of the internal combustion engine 1 in the scavenging operating mode, as calculated through the equation [11] set forth in the description above, with a safety value SV (usually smaller than 1) of the minimum air/fuel ratio $\lambda_{min}$ that can be obtained in the exhaust gases upstream of the catalytic converter 11 during the operation of the internal combustion engine 1, which is calculated in a preliminary adjustment and set up phase and substantially lies in a neighbourhood smaller than 1.

In case the minimum air/fuel ratio $\lambda_{min}$ that can be obtained in the exhaust gases upstream of the catalytic converter 11 during the operation of the internal combustion engine 1 in the scavenging operating mode, as calculated through the equation [11] set forth in the description above, is smaller than the safety value SV of the minimum air/fuel ratio that can be obtained in the exhaust gases upstream of the catalytic converter 11 during the operation of the internal combustion engine 1, the electronic control unit 22 is designed to carry on with the operation of the internal combustion engine 1 in the "scavenging" operating mode.

In case the minimum air/fuel ratio $\lambda_{min}$ that can be obtained in the exhaust gases upstream of the catalytic converter 11 during the operation of the internal combustion engine 1 in the scavenging operating mode, as calculated through the equation [11] set forth in the description above, is greater than the safety value SV of the minimum air/fuel ratio that can be obtained in the exhaust gases upstream of the catalytic converter 11 during the operation of the internal combustion engine 1, the electronic control unit 22 is designed to stop the operation of the internal combustion engine 1 in the "scavenging" operating mode.

The method described above to control the temperature of the exhaust gases has some advantages. In particular, it ensures a small computing load for the electronic control unit 22 and avoids high thermal stresses for the components of the exhaust system during the operation in the "scavenging" operating mode of the internal combustion engine 1.

The invention claimed is:

1. A method to control the temperature of the exhaust gases of a supercharged internal combustion engine (1) comprising a number of cylinders (3), an intake manifold (4), which is connected to the cylinders (3), an exhaust manifold (5), which is connected to the cylinders (3), as well, and feeds the exhaust gases produced by the combustion taking place inside the cylinders (3) to an exhaust system, and a turbocharger (12), which is provided with a turbine (13) and a supercharger (14); and a sensor (25), which measures the air/fuel ratio of the exhaust gases downstream of the exhaust manifold (5); the supercharged internal combustion engine (1), furthermore, is designed to permit the passage of air not involved in the combustion taking place inside the cylinders (3) from the intake manifold (4) directly into the exhaust pipe (10); the method comprises the steps of:

determining the flow rate ($m_{air\_scav}$) of air that is not involved in the combustion taking place inside the cylinders (3) and flows directly from the intake manifold (4) into the exhaust pipe (10);

determining the minimum air/fuel ratio ($\lambda_{min}$) of the exhaust gases downstream of the exhaust manifold (5) as a function of the flow rate ($m_{air\_scav}$) of air that is not involved in the combustion taking place inside the cylinders (3) and flows directly from the intake manifold (4) into the exhaust pipe (10);

detecting the air/fuel ratio ($\lambda_{meas}$) of the exhaust gases downstream of the exhaust manifold (5) provided by the sensor (25);

comparing the air/fuel ratio ($\lambda_{meas}$) of the exhaust gases downstream of the exhaust manifold (5) detected by the sensor (25) and/or the minimum air/fuel ratio ($\lambda_{min}$) of the exhaust gases downstream of the exhaust manifold (5) with a number of threshold values ($UTV_{OL\_SCAV}$, $UTV_{INHIB\_SCAV}$, $UTV_{LIMIT\_SCAV}$, $LTV_{OL\_SCAV}$, $LTV_{INHIB\_SCAV}$, $LTV_{LIMIT\_SCAV}$, SV); and controlling the supercharged internal combustion engine as a function of the comparison between the air/fuel ratio ($\lambda_{meas}$) of the exhaust gases downstream of the exhaust manifold (5) detected by the sensor (25) and/or the minimum air/fuel ratio ($\lambda_{min}$) of the exhaust gases downstream of the exhaust manifold (5) with said number of threshold values ($UTV_{OL\_SCAV}$, $UTV_{INHIB\_SCAV}$, $UTV_{LIMIT\_SCAV}$, $LTV_{OL\_SCAV}$, $LTV_{INHIB\_SCAV}$, $LTV_{LIMIT\_SCAV}$, SV).

2. A method according to claim 1 and comprising the further steps of:

comparing the air/fuel ratio ($\lambda_{meas}$) of the exhaust gases downstream of the exhaust manifold (5) detected by the sensor (25) with a first pair of threshold values ($UTV_{LIMIT\_SCAV}$, $LTV_{LIMIT\_SCAV}$); and limiting the flow rate ($m_{air\_scav}$) of air that is not involved in the combustion taking place inside the cylinders (3) and flows directly from the intake manifold (4) into the exhaust pipe (10), if the air/fuel ratio ($\lambda_{meas}$) of the exhaust gases downstream of the exhaust manifold (5) detected by the sensor (25) is not comprised within the interval defined by the first pair of threshold values ($UTV_{LIMIT\_SCAV}$, $LTV_{LIMIT\_SCAV}$).

3. A method according to claim 1 and comprising the further steps of:

comparing the air/fuel ratio ($\lambda_{meas}$) of the exhaust gases downstream of the exhaust manifold (5) detected by the sensor (25) with a second pair of threshold values ($UTV_{INHIB\_SCAV}$, $LTV_{INHIB\_SCAV}$); and forbidding the passage of a flow rate ($m_{air\_scav}$) of air that is not involved in the combustion taking place inside the cylinders (3) directly from the intake manifold (4) into the exhaust pipe (10), if the air/fuel ratio ($\lambda_{meas}$) of the exhaust gases downstream of the exhaust manifold (5) detected by the sensor (25) is not comprised within the interval defined by the second pair of threshold values ($UTV_{INHIB\_SCAV}$, $LTV_{INHIB\_SCAV}$).

4. A method according to claim 2, wherein the interval defined by the first pair of threshold values ($UTV_{LIMIT\_SCAV}$, $LTV_{LIMIT\_SCAV}$) is comprised within the interval defined by the second pair of threshold values ($UTV_{INHIB\_SCAV}$, $LTV_{INHIB\_SCAV}$).

5. A method according to claim 1 and comprising the further steps of:

comparing the air/fuel ratio ($\lambda_{meas}$) of the exhaust gases downstream of the exhaust manifold (5) detected by the sensor (25) with a third pair of threshold values ($UTV_{OL\_SCAV}$, $LTV_{OL\_SCAV}$); and controlling the air/fuel ratio of the exhaust gases downstream of the exhaust manifold (5) in open-loop, if the air/fuel ratio ($\lambda_{meas}$) of the exhaust gases downstream of the exhaust manifold (5) detected by the sensor (25) is not comprised within the interval defined by the third pair of threshold values ($UTV_{OL\_SCAV}$, $LTV_{OL\_SCAV}$).

6. A method according to claim 1 and comprising the further steps of:

comparing the air/fuel ratio ($\lambda_{meas}$) of the exhaust gases downstream of the exhaust manifold (5) detected by the sensor (25) with the minimum air/fuel ratio ($\lambda_{min}$) of the exhaust gases downstream of the exhaust manifold (5); and limiting the flow rate ($m_{air\_scav}$) of air that is not involved in the combustion taking place inside the cylinders (3) and flows directly from the intake manifold (4) into the exhaust pipe (10), if the air/fuel ratio ($\lambda_{meas}$) of the exhaust gases downstream of the exhaust manifold (5) detected by the sensor (25) is smaller than the minimum air/fuel ratio ($\lambda_{min}$) of the exhaust gases downstream of the exhaust manifold (5).

7. A method according to claim 1 and comprising the further steps of:

comparing the minimum air/fuel ratio ($\lambda_{min}$) of the exhaust gases downstream of the exhaust manifold (5) with a safety value (SV); and forbidding the passage of a flow rate ($m_{air\_scav}$) of air that is not involved in the combustion taking place inside the cylinders (3) directly from the intake manifold (4) into the exhaust pipe (10), if the minimum air/fuel ratio ($\lambda_{min}$) of the exhaust gases downstream of the exhaust manifold (5) is greater than the safety value (SV).

8. A method according to claim 1 and comprising the further steps of:

determining the reference value of the air/fuel ratio ($\lambda_{target}$) of the exhaust gases as a function of the flow rate ($m_{air\_scav}$) of air that is not involved in the combustion taking place inside the cylinders (3) and flows directly from the intake manifold (4) into the exhaust pipe (10);

calculating the difference between the air/fuel ratio ($\lambda_{meas}$) of the exhaust gases downstream of the exhaust manifold (5) detected by the sensor (25) and the reference value of the air/fuel ratio ($\lambda_{target}$) of the exhaust gases; and controlling the supercharged internal combustion engine (1) as a function of the difference between the air/fuel ratio ($\lambda_{meas}$) of the exhaust gases downstream of the exhaust manifold (5) detected by the sensor (25) and the reference value of the air/fuel ratio ($\lambda_{target}$) of the exhaust gases.

9. A method according to claim 8, wherein the reference value of the air/fuel ratio ($\lambda_{target}$) is variable as a function of the engine point and of the thermal state of the internal combustion engine (1).

10. A method according to claim 8 and comprising the further step of filtering the difference between the air/fuel ratio ($\lambda_{meas}$) of the exhaust gases downstream of the exhaust manifold (5) detected by the sensor (25) and the reference value of the air/fuel ratio ($\lambda_{target}$) of the exhaust gases.

11. A method according to claim 1, wherein the minimum air/fuel ratio ($\lambda_{min}$) of the exhaust gases downstream of the exhaust manifold (5) is calculated by means of the formula:

$$\lambda_{min} = 1 - \frac{c_p \Delta T_{max}}{k_i} * (1 + A_{st}/F_{st}) \qquad [11]$$

$\lambda_{min}$ air/fuel ratio that can be obtained in the exhaust gases downstream of the exhaust manifold (5);

$c_p$ specific heat of the air;

$\Delta T_{max}$ maximum temperature difference in an exhaust system;

$k_i$ lower heating value of the fuel being used; and $A_{st}/F_{st}$ stoichiometric ratio of the fuel being used.

* * * * *